US006056232A

United States Patent [19]
Karaki et al.

[11] Patent Number: 6,056,232
[45] Date of Patent: May 2, 2000

[54] METHOD OF LOADING FILM ROLL ON FILM UNWINDER SHAFT AND FILM PRODUCING AND PACKAGING SYSTEM

[75] Inventors: Hideyuki Karaki; Chiaki Suzuki, both of Minamiashigara; Yoshinobu Misumi, Odawara; Takayuki Kambara, Minamiashigara; Susumu Sato, Odawara, all of Japan

[73] Assignee: Fuji Photo Film Co., Ltd., Kanagawa-ken, Japan

[21] Appl. No.: 09/140,754

[22] Filed: Aug. 25, 1998

[30] Foreign Application Priority Data

Aug. 27, 1997 [JP] Japan .................................... 9-231191
Sep. 4, 1997 [JP] Japan .................................... 9-239840

[51] Int. Cl.[7] ................................................. B65H 19/00
[52] U.S. Cl. .................................... 242/559.3; 242/560.1; 242/560.2; 242/563
[58] Field of Search ............................... 242/559.3, 559, 242/559.1, 560, 560.1, 560.2, 563

[56] References Cited

U.S. PATENT DOCUMENTS

| | | | |
|---|---|---|---|
| 4,632,326 | 12/1986 | Boote et al. | 242/560 X |
| 4,953,805 | 9/1990 | Rauh | 242/560.1 X |
| 5,219,127 | 6/1993 | Boldrini et al. | 242/560.2 X |
| 5,474,251 | 12/1995 | Neri | 242/559.3 X |
| 5,601,252 | 2/1997 | Draghetti | 242/559.1 |
| 5,653,087 | 8/1997 | Spada et al. | 242/560 X |
| 5,709,354 | 1/1998 | Blandin et al. | 242/559.1 X |

*Primary Examiner*—Donald P. Walsh
*Assistant Examiner*—William A. Rivera
*Attorney, Agent, or Firm*—Sughrue, Mion, Zinn, Macpeak & Seas, PLLC

[57] ABSTRACT

A carriage has a support shaft for supporting a plurality of film rolls and can be closed by a light shield cover to place the film rolls in a light-shielded state. A film roll storage mechanism is disposed in a dark room and has a shank for receiving the film rolls from the carriage. The film roll storage mechanism can transfer the film rolls one at a time from the shank onto a film unwinding shaft. A positioning mechanism positions the support shaft and the shank coaxially with each other and locks the carriage with respect to the film roll storage mechanism.

15 Claims, 14 Drawing Sheets

F I G. 10
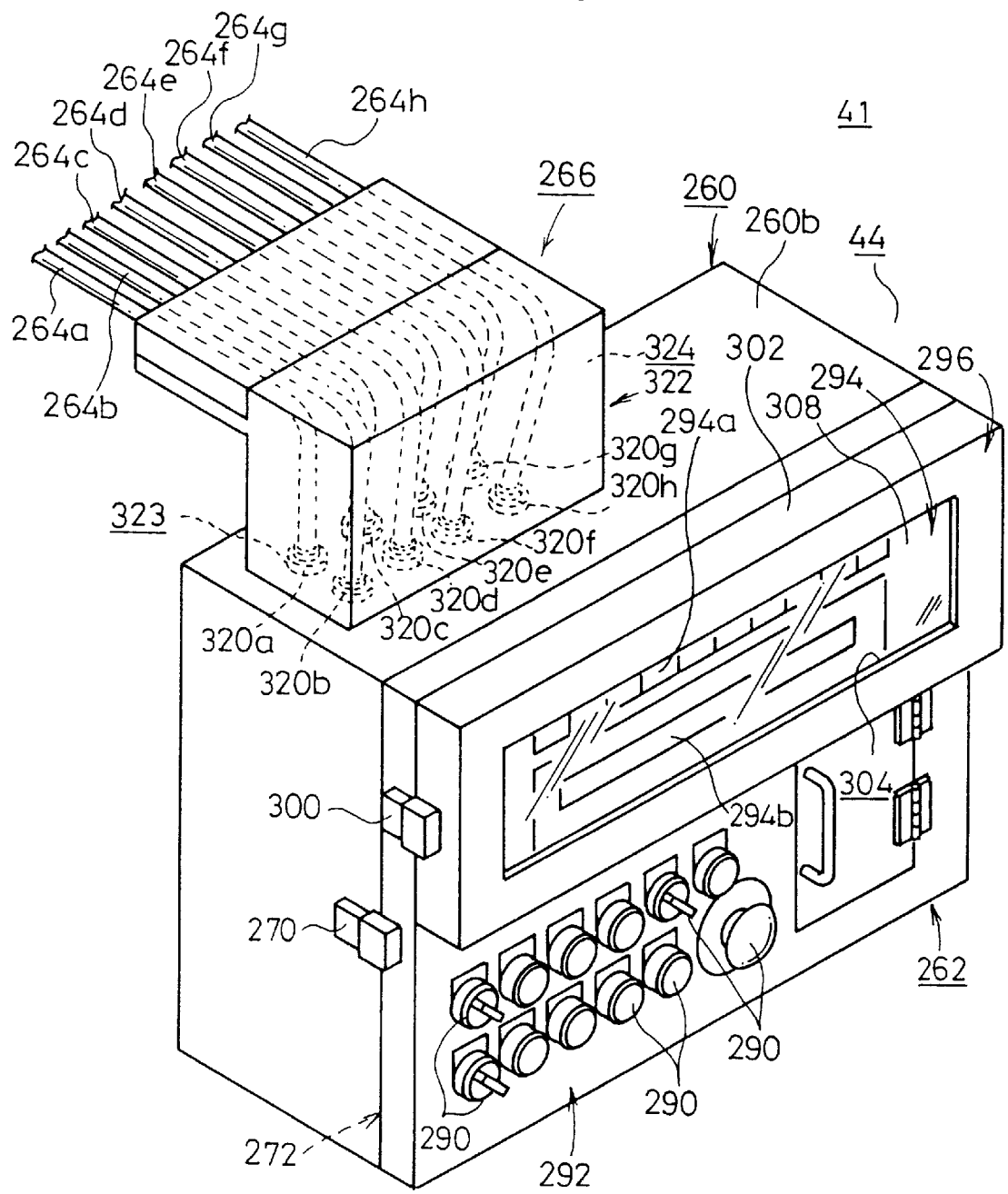

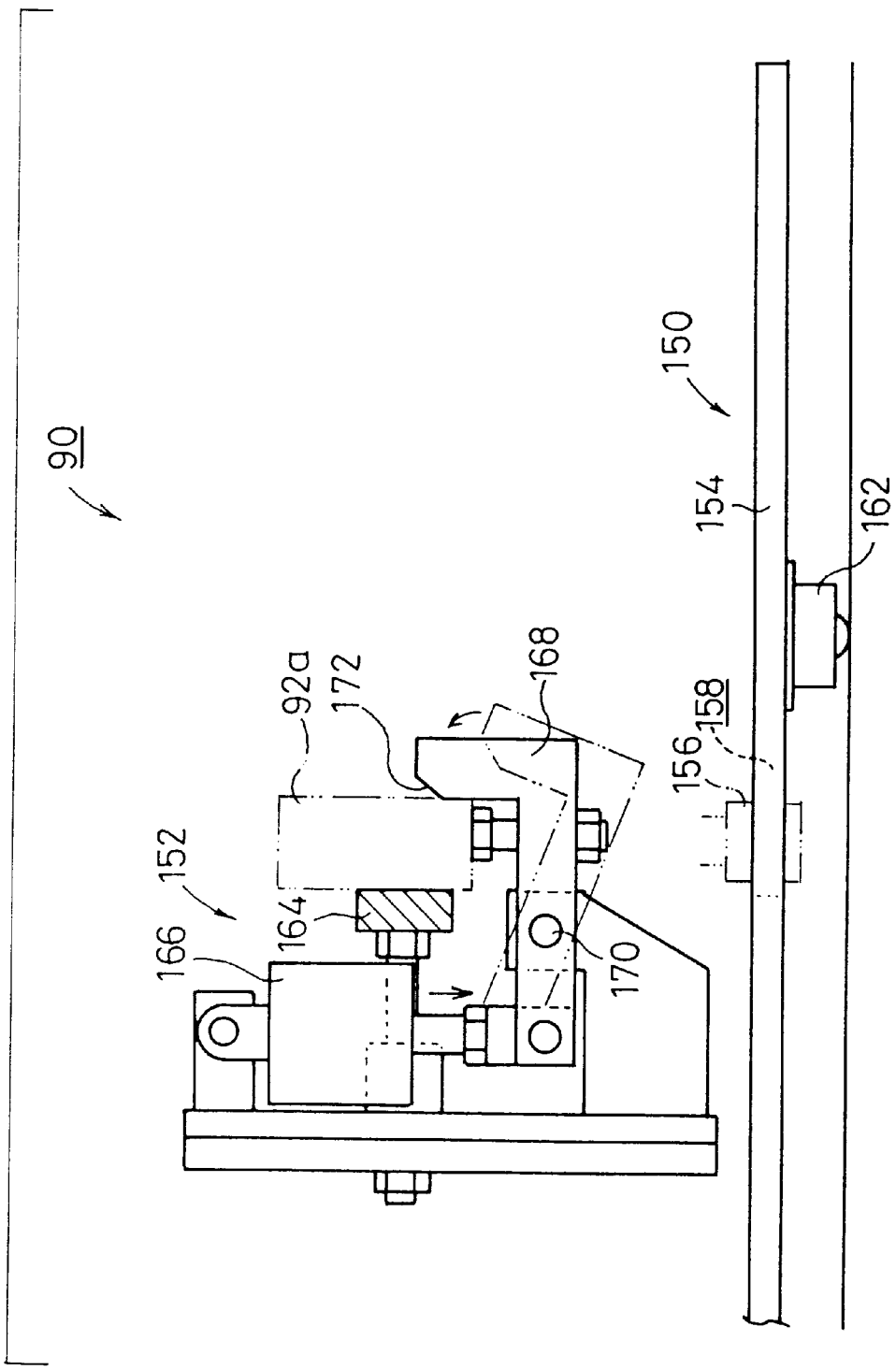

METHOD OF LOADING FILM ROLL ON FILM UNWINDER SHAFT AND FILM PRODUCING AND PACKAGING SYSTEM

BACKGROUND OF THE INVENTION

1. Field of the Invention

The present invention relates to a method of loading a film roll, i.e., a roll of elongate photographic photosensitive film, onto a film unwinding shaft of a film producing apparatus, and a film producing and packaging system.

2. Description of the Related Art

For producing and packaging a photographic photosensitive film, it has been customary to perform various steps including the steps of producing a film of given length, winding the film, placing the wound film into a film cartridge, and inserting the film cartridge into a case.

These various steps are carried out by a station comprising a film supply unit for unwinding a film roll and cutting the unwound film to a film of given length, a film coiling unit for coiling the film of given length on a spool thereby to produce a film coil, a cartridge producing unit for staking a cap on an end of a tubular cartridge blank sheet thereby to produce a cartridge with one open end, an assembling unit for inserting the film coil into the cartridge and staking another cap on the open end of the cartridge thereby to produce an assembled cartridge, and an encasing unit for placing the assembled cartridge into a case and attaching a case cap on an open end of the case thereby to produce a packaged product.

In the above station, the film roll is manually loaded on a film unwinder shaft of the film supply unit for mass-producing packaged products. However, since the film roll is relatively heavy, it is considerably tedious, time-consuming, and labor-intensive to manually lift the film roll and load the film roll on the film unwinder shaft.

The film supply unit, the film coiling unit, and the assembling unit are housed in a dark room to prevent the film from being exposed to external light. The dark room needs to have a control console manually operable by the operator for effectively switching between lots, repairing various devices, and performing maintenance activities.

The control console holds a control circuit, switches, display units, etc. with a number of electric cables connected thereto. Because these electric cables extend from the control console into the dark room through openings defined in the control console, external light tends to leak into the dark room through the openings. Therefore, films of given length which are being processed in the dark room may possibly be exposed to the leaking external light.

SUMMARY OF THE INVENTION

It is therefore an object of the present invention to provide a method of loading film rolls easily and smoothly into a film producing apparatus, and a film producing and packaging system which allows film rolls to be easily and smoothly loaded into a film producing apparatus.

A major object of the present invention is to provide a film producing and packaging system which is capable of effectively shielding a plurality of film rolls from light and allowing the film rolls to be handled efficiently with ease.

Another object of the present invention is to provide a film producing and packaging system which is capable of reliably preventing light from leaking from a control console disposed in a dark room with a relatively simple structure.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 is a perspective view of a control console of the film producing and packaging system;

FIG. 14 is an elevational view showing the manner in which a fixing unit of the loading unit operates.

DESCRIPTION OF THE PREFERRED EMBODIMENT

Figure 1:
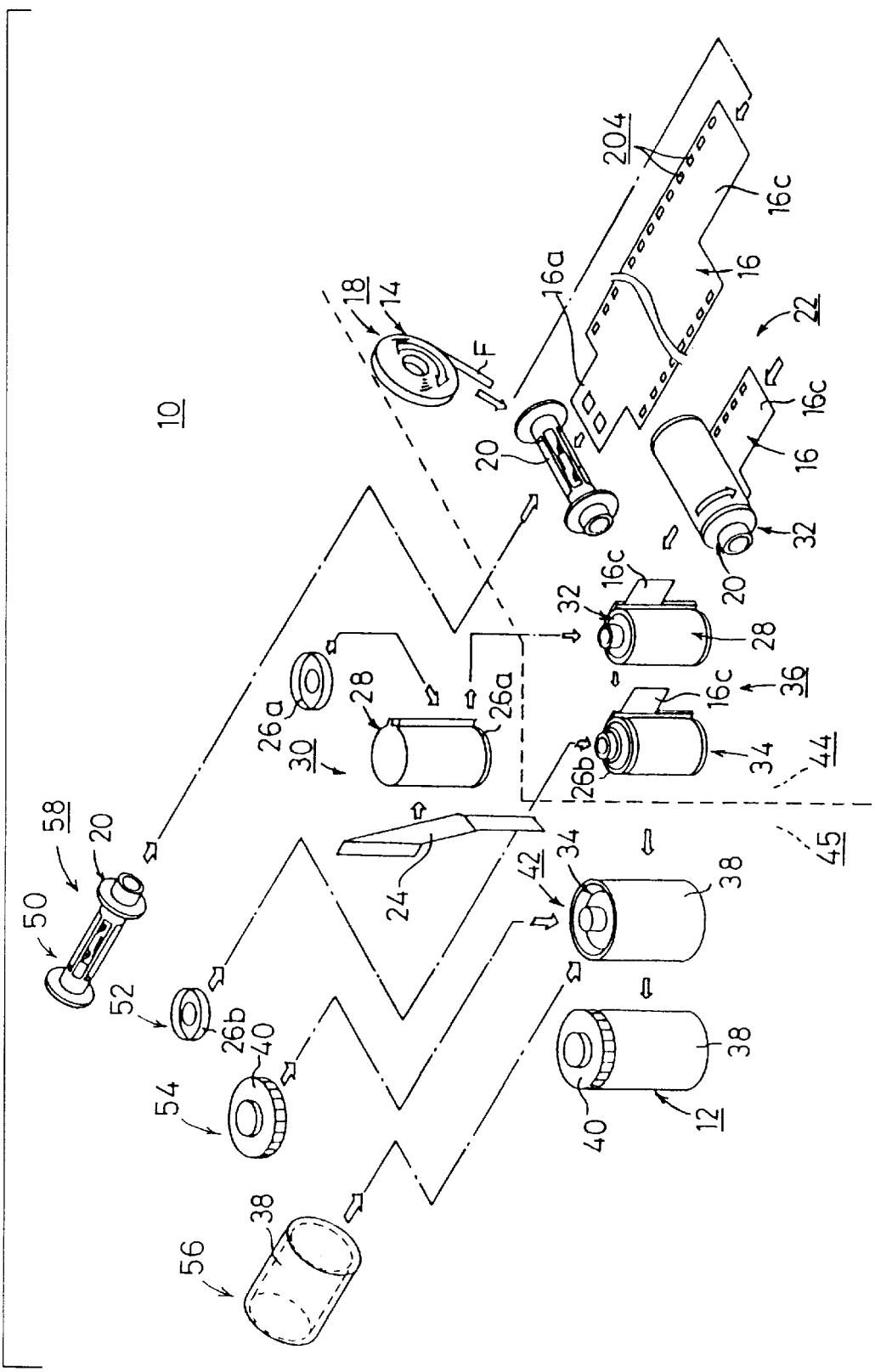
FIG. 1 is a schematic perspective view illustrative of the manner in which a packaged product is manufactured by a film producing and packaging system according to the present invention.

FIG. 1 schematically shows in perspective the manner in which a packaged product 12 is manufactured by a film producing and packaging system 10 according to the present invention. The film producing and packaging system 10 are shown in plane and side elevation in FIGS. 2 and 3, respectively.

Figure 2:
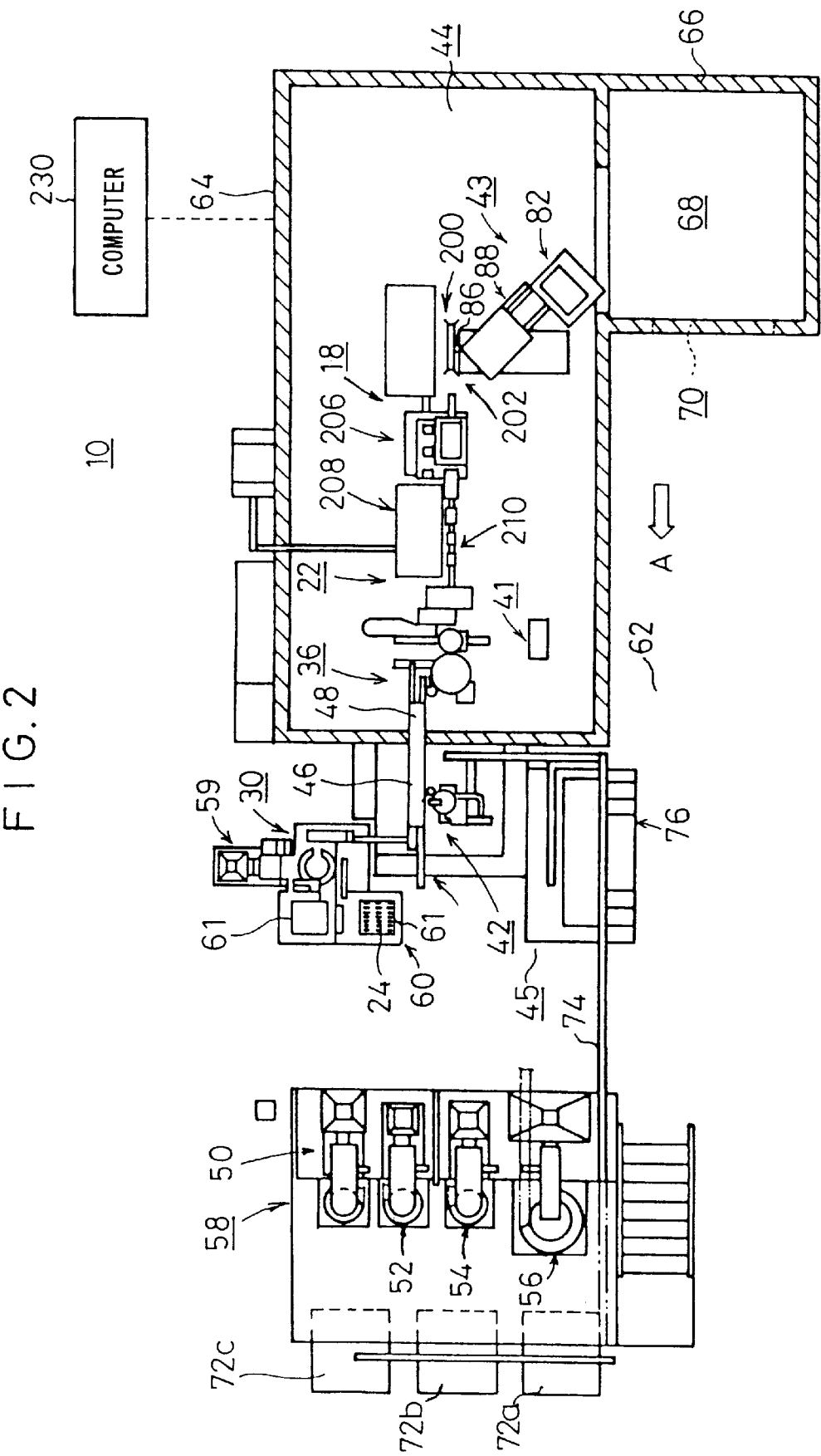
FIG. 2 is a schematic plan view of the film producing and packaging system.
Figure 3:
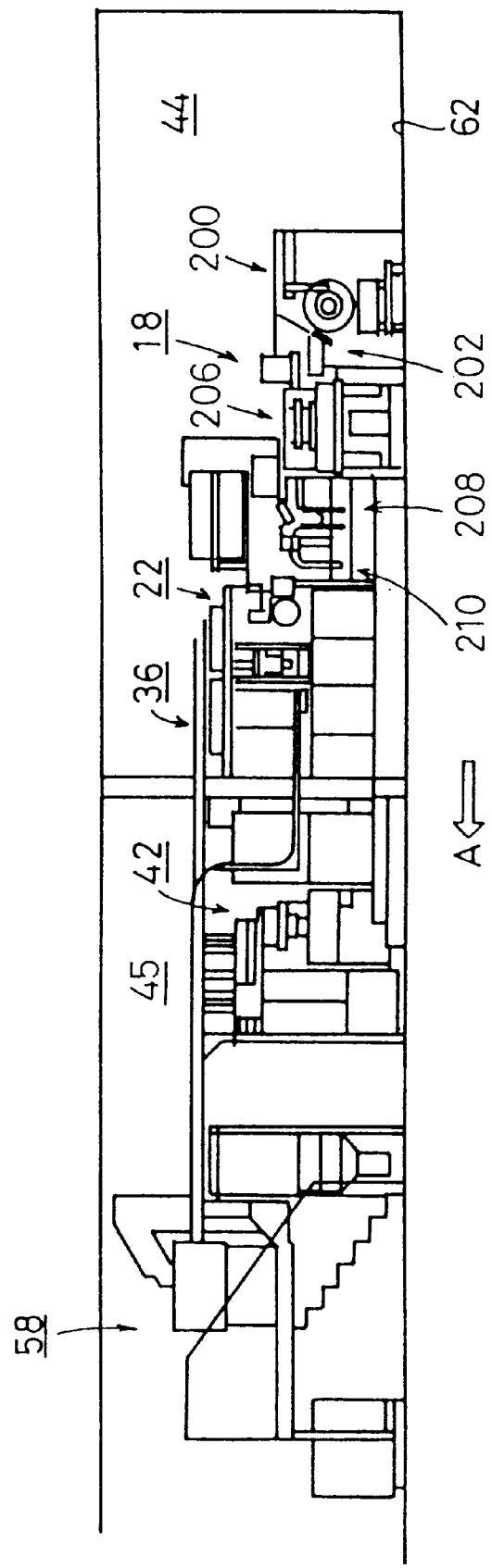
FIG. 3 is a schematic side elevational view of the film producing and packaging system.

As shown in FIGS. 1 through 3, the film producing and packaging system 10 generally comprises a film supply unit (film producing apparatus) 18 for unwinding a film roll 14 of elongate photographic photosensitive film F (hereinafter referred to as elongate film F), cutting the unwound elongate film F into a film 16 of given length, and supplying the film 16, a film coiling unit 22 for positioning a spool 20 and the film 16 relatively to each other and winding the film 16 on the spool 20, a cartridge producing unit 30 for rounding a cartridge blank sheet 24 into a tubular form and staking a cap 26a on one end of the tubular form thereby to produce a cartridge 28 with one open end, an assembling unit 36 for inserting a film coil 32, which is made up of the film 16 wound on the spool 20, into the cartridge 28 through the open end thereof, and then staking another cap 26b on the open end of the cartridge 28 thereby to produce an assembled cartridge 34, an encasing unit 42 for placing the assembled cartridge 34 into a case 38 and attaching a case cap 40 to an open end of the case 38 thereby to produce a packaged product 12, and a loading unit 43 (see FIG. 2) for loading the film roll 14 into the film supply unit 18.

The film supply unit 18, the film coiling unit 22, the assembling unit 36, and a control console 41 are housed in a dark room 44, and the cartridge producing unit 30, the encasing unit 42, and other devices are housed in a bright room 45.

As shown in FIG. 2, the film supply unit 18, the film coiling unit 22, the assembling unit 36, and encasing unit 42 are arrayed in line with each other along a film producing and packaging process as indicated by the arrow A. Between the dark room 44 and the bright room 45, there extend a first linear feed path 46 for delivering cartridges 28 from the cartridge producing unit 30 to the assembling unit 36 and a second linear feed path 48 for delivering assembled cartridges 34 from the assembling unit 36 to the encasing unit 42.

Downstream of the film producing and packaging process, there is disposed a parts supply apparatus 58 comprising a spool supply unit 50 for supplying spools 20 to the film coiling unit 22, a cap supply unit 52 for supplying caps 26b to the assembling unit 36, a case cap supply unit 54 for supplying case caps 40 to the encasing unit 42, and a case supply unit 56 for supplying cases 38 to the encasing unit 42. The spool supply unit 50, the cap supply unit 52, the case cap supply unit 54, and the case supply unit 56 are closely positioned in the housing of the parts supply apparatus 58.

A cap supply unit 59 for supplying caps 26a and a cartridge blank sheet supply unit 60 for supplying cartridge blank sheets 24 are disposed near the cartridge producing unit 30.

The film producing and packaging system 10 is installed on a floor 62 which supports a partition wall 64 extending in covering relation to the film supply unit 18, the film coiling unit 22, and the assembling unit 36. The dark room 44 is defined as a desired working space by the partition wall 64. An antechamber 68 defined by a partition wall 66 is openably joined to the dark room 44. The antechamber 68 is openable into the bright room 45 through an opening 70.

Packaged product accumulating units 72a, 72b, 72c are disposed near the parts supply apparatus 58. The packaged product accumulating units 72a, 72b, 72c and the encasing unit 42 are coupled to each other by a conveyor 74 which is associated with a semifinished product accumulating unit 76.

Figure 4:
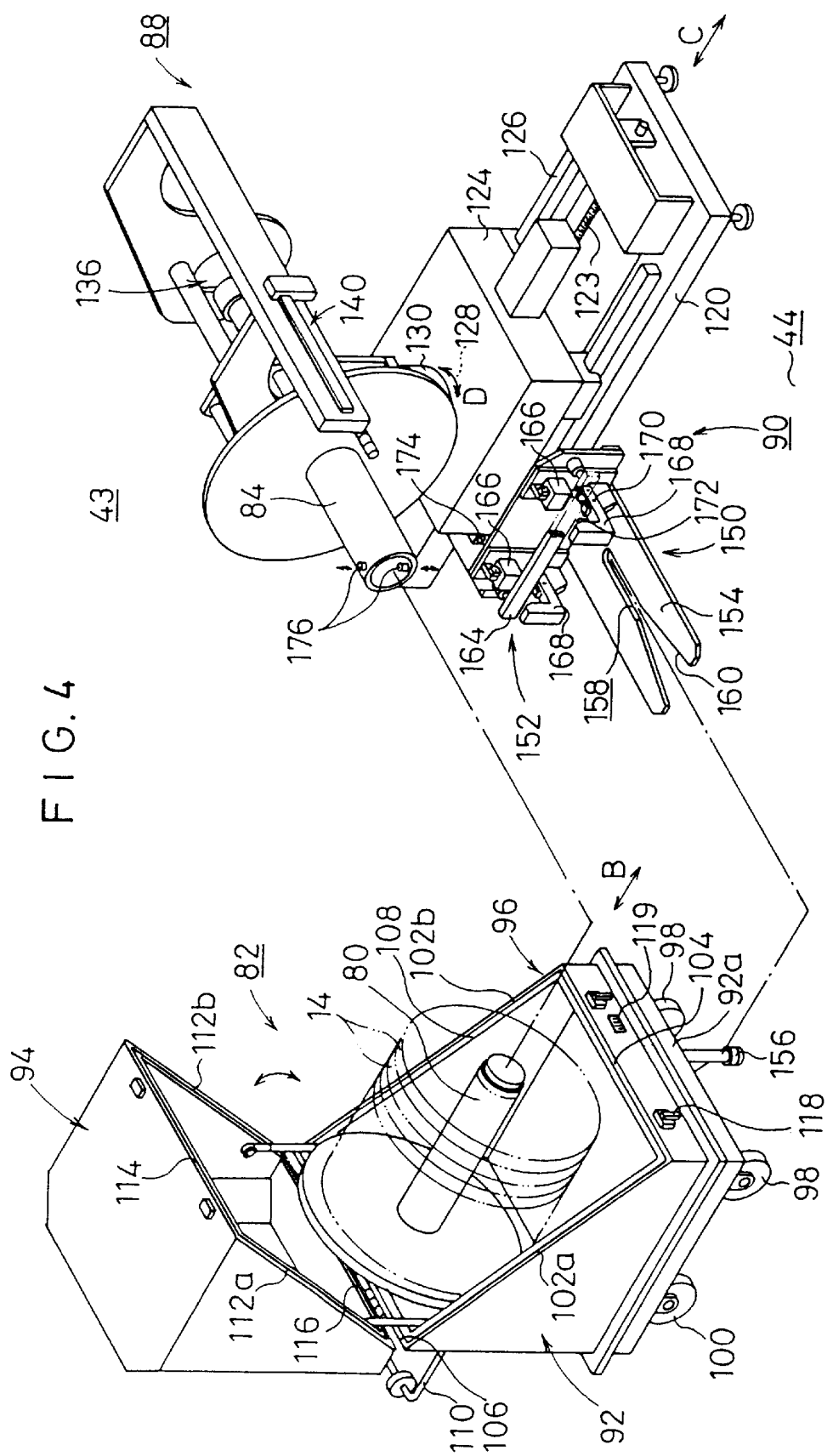
FIG. 4 is a perspective view of a loading unit of the film producing and packaging system.
Figure 5:
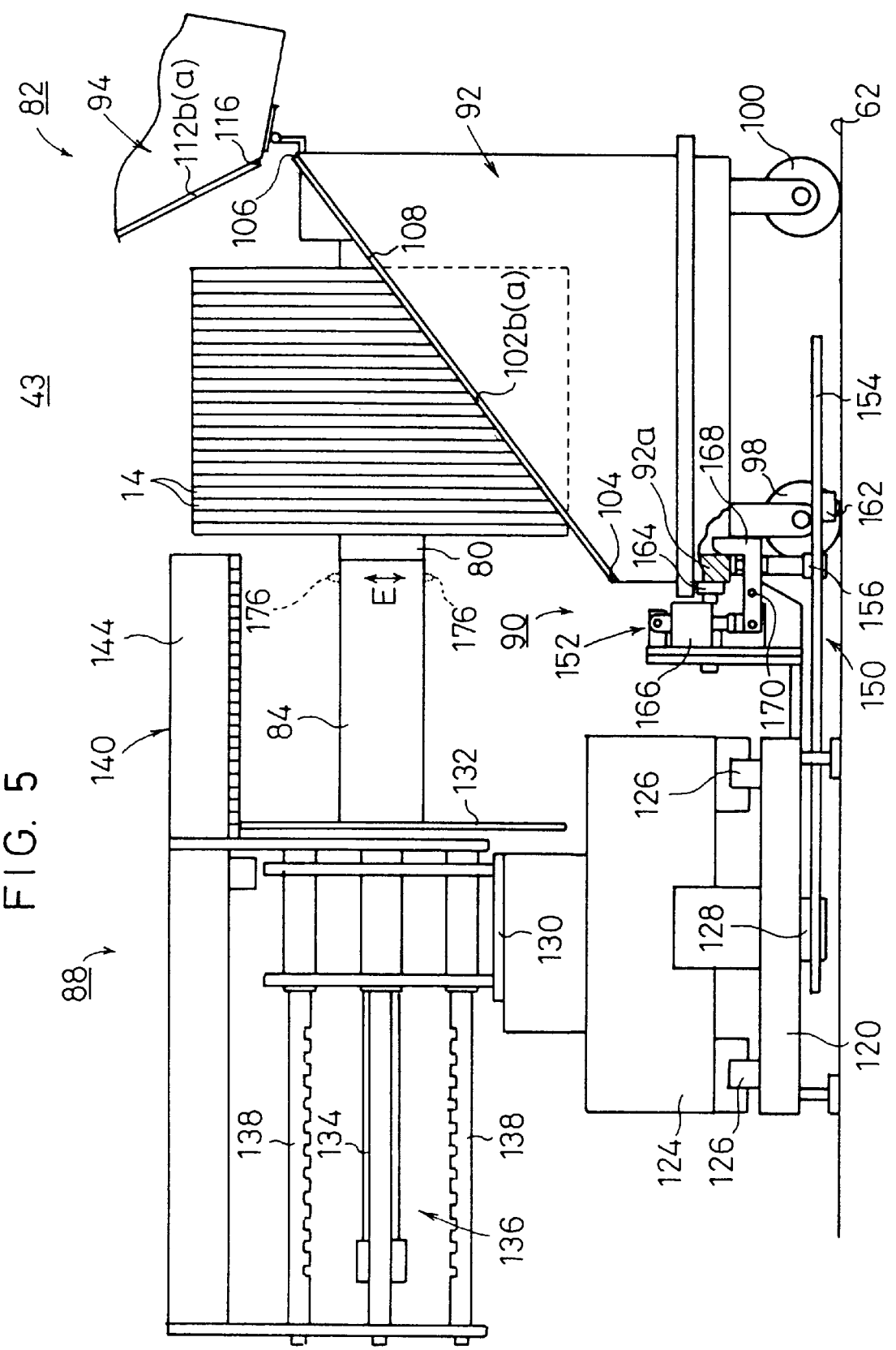
FIG. 5 is a side elevational view of the loading unit.
Figure 6:
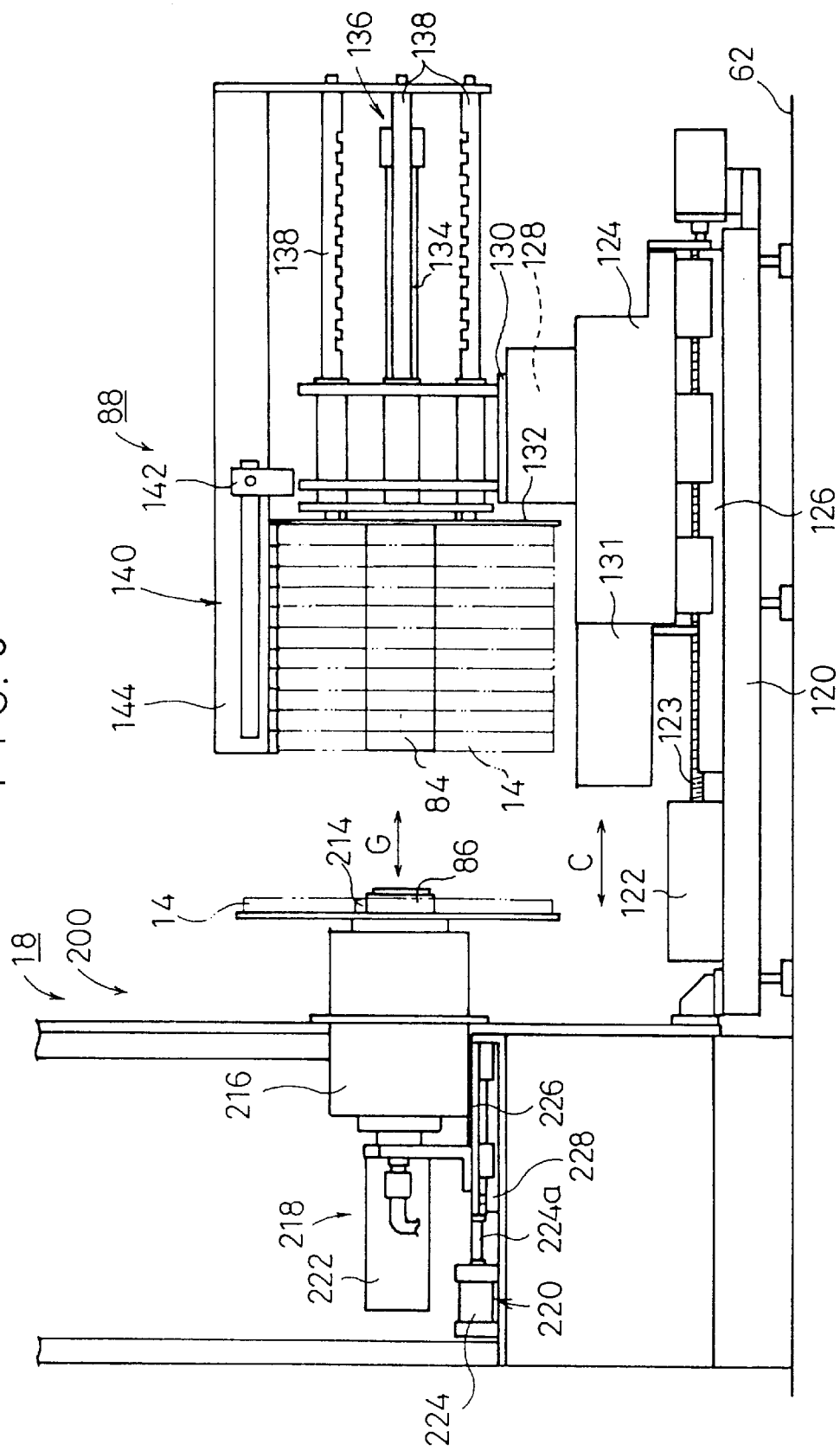
FIG. 6 is a side elevational view of a film roll storage mechanism of the loading unit.

As shown in FIGS. 4 through 6, the loading unit 43 comprises a carriage 82 for covering a plurality of film rolls 14 to shield them from light, the carriage 82 having a support shaft 80 for supporting the film rolls 14, a film roll storage mechanism 88 disposed in the dark room 44 and having a shank 84 for receiving film rolls 14 from the carriage 82, for loading film rolls 14 one at a time onto a film unwinding shaft 86 of the film supply unit 18, and a positioning mechanism 90 for positioning the support shaft 80 and the shank 84 coaxially with each other and fixing the carriage 82 and the film roll storage mechanism 88 with respect to each other.

As shown in FIGS. 4 and 5, the carriage 82 comprises a carriage housing 92 supporting the support shaft 80 horizontally with one end of the support shaft 80 secured to the carriage housing 92, a light shield cover 94 openable and closable with respect to the carriage housing 92 for placing film rolls 14 onto and removing film rolls 14 from the support shaft 80, and a light shield member 96 disposed between the carriage housing 92 and the light shield cover 94.

The carriage housing 92 comprises a frame 92a which supports on its lower surface a pair of wheels 98 rotatably mounted on a front portion thereof and oriented in a fixed direction and a pair of wheels 100 rotatably mounted on a rear portion thereof and freely orientable in various directions. The carriage housing 92 has a substantially rectangular shape as viewed in side elevation, and has a pair of laterally spaced side mating surfaces 102a, 102b extending obliquely downwardly along the axial directions (indicated by the arrow B) of the support shaft 80 toward a distal end of the support shaft 80, a lower front mating surface 104 extending perpendicularly to the side mating surfaces 102a, 102b and joined to front ends thereof, and a higher rear mating surface 106 extending perpendicularly to the side mating surfaces 102a, 102b and joined to rear ends thereof.

The side mating surfaces 102a, 102b, the front lower mating surface 104, and the rear mating surface 106 extend respectively as straight surfaces. The front mating surface 104 is positioned lower than lower edges of the film rolls 14 which are supported on the support shaft 80 (see FIG. 5). The light shield member 96 comprises an elongate elastomeric element 108, such as of rubber, extending along and mounted on upper edges of the side mating surfaces 102a, 102b, the front lower mating surface 104, and the rear mating surface 106. A handle 110 is mounted on a rear end of the carriage housing 92 near its upper edge.

The light shield cover 94 is swingably hinged to the upper edge of the rear end of the carriage housing 92. When the light shield cover 94 is closed on the carriage housing 92, the carriage 82 is in the form of a casing substantially shaped as a rectangular parallelepiped as a whole. The light shield cover 94 has a pair of side mating surfaces 112a, 112b, a front mating surface 114, and a rear mating surface 116. When the light shield cover 94 is closed on the carriage housing 92, these mating surfaces 112a, 112b, 114, 116 are pressed against the light shield member 96 on the corresponding mating surfaces 102a, 102b, 104, 106 for thereby reliably shielding the film rolls 14 from light.

The light shield cover 94 and the carriage housing 92 can be locked in the closed position by locks 118. An ID (identification) card (ID information storage medium) 119 which stores ID information including the name, number, etc. of the carriage 82 is attached to a front end of the carriage housing 92.

The film roll storage mechanism 88 includes a main base 120 mounted on the floor 62. The base 120 supports thereon a slide base 124 movable back and forth in the directions indicated by the arrow C along a rail 126 on the main base 120 by a horizontal ball screw 123 which can be rotated about its own axis by a motor 122 mounted on the main base 120. As shown in FIGS. 4 through 7, a turn base 130 is mounted on the slide base 124 by a vertical rotatable shaft 128 extending therein, and the shank 84 for holding a plurality of film rolls 14 is mounted horizontally on the turn base 130. The shaft 128 is rotatable in the directions indicated by the arrow D by a turning mechanism including the motor 131.

A pusher disk 132 for delivering film rolls 14 on the shank 84 one by one to the film supply unit 18 is mounted on the shank 84 for axial back and forth movement thereon. The pusher disk 132. is coupled to an actuator unit 136 including a cylinder 134 and a plurality of guide bars 138 extending away from the shank 84.

The turn base 130 supports thereon a splice assisting assembly 140 extending parallel to the shank 84. The splice assisting assembly 140 comprises a cutter 142 for cutting ends of elongate films F of film rolls 14 mounted on the shank 84, a suction box 144 for attracting the ends of the elongate films F of the film rolls 14 under vacuum, and photosensors (not shown) for individually detecting the film rolls 14.

Figure 7:
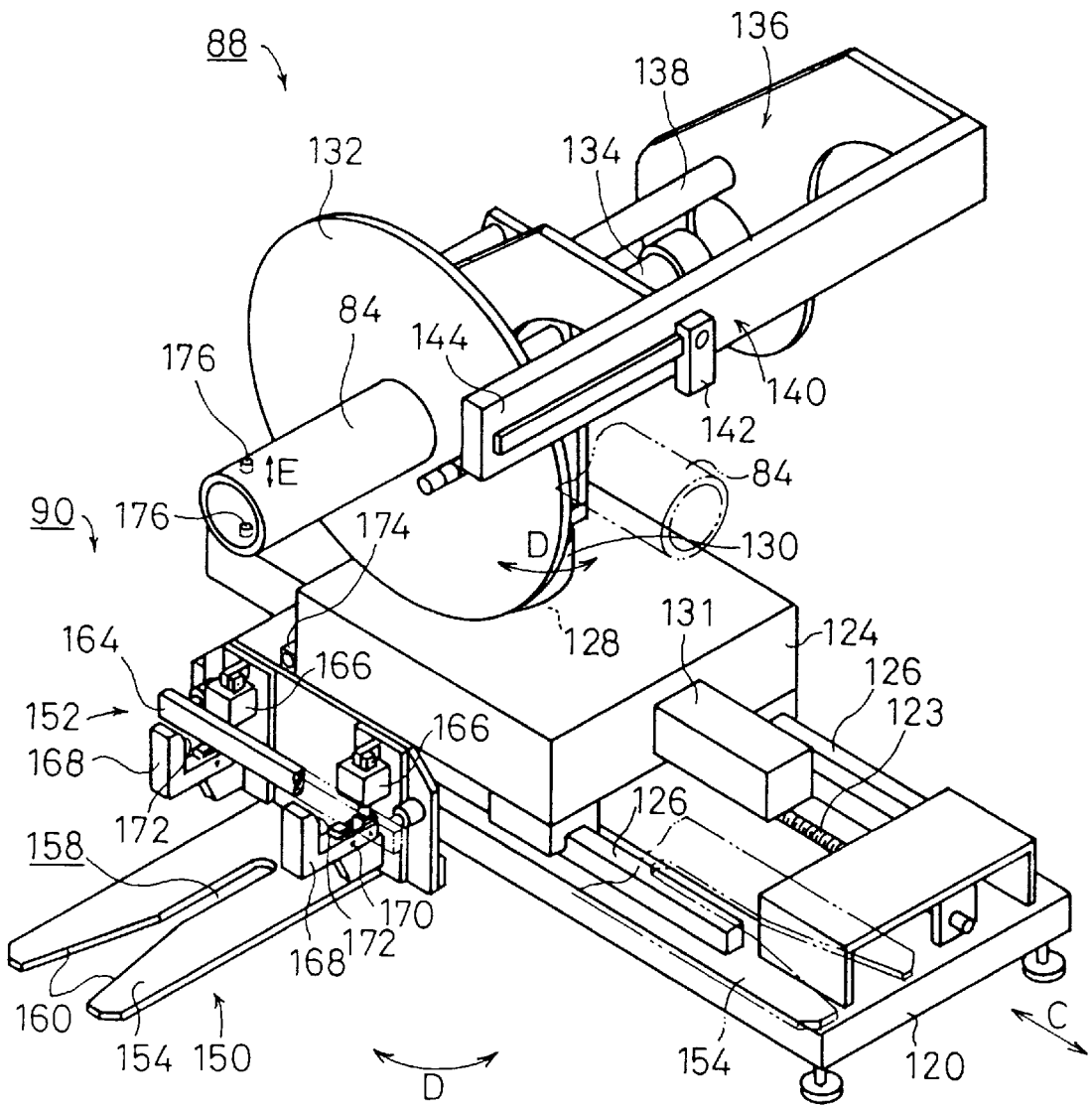
FIG. 7 is a perspective view of the film roll storage mechanism.

As shown in FIGS. 4, 5, and 7, the positioning mechanism 90 comprises a guide mechanism 150 for guiding the carriage 82 to a positioning location of the film roll storage mechanism 88, and a locking mechanism 152 for holding the carriage 82 on the film roll storage mechanism 88.

The guide mechanism 150 comprises a guide plate 154 mounted on the film roll storage mechanism 88 and a guide roller 156 mounted on the carriage 82. The guide plate 154 has an end fixed to the lower end of the rotatable shaft 128 which serves to turn the shank 84. Therefore, the guide plate 154 turns about the vertical axis in unison with the shank 84. The guide plate 154 has a guide slot 158 defined therein and extending toward the other end thereof parallel to the axis of the shank 84. The guide slot 158 has tapered edges 160 spreading away from each other toward the open end of the guide slot 158 at the other end of the guide plate 154. A pair of ball casters 162 (see FIG. 5) is mounted on a lower surface of the guide plate 154 for rolling engagement with the floor 62.

The guide roller 156 is rotatably supported on a lower surface of the frame 92a of the carriage housing 92 and positioned between the wheels 98. The guide roller 156 can be inserted into the guide slot 158 in the guide plate 154 while being guided by the tapered edges 160.

The locking mechanism 152 serves to draw the frame 92a of the carriage housing 92 toward the film roll storage mechanism 88. As shown in FIGS. 4, 5, and 7, the locking mechanism 152 comprises a bearing plate 164 mounted on the main base 120 for abutment against a front face of the frame 92a, and a pair of hooks 168 mounted on the main base 120 and vertically swingable by a pair of respective cylinders 166 mounted on the main base 120. The hooks 168 are vertically swingable about respective pivot pins 170 and have respective tapered surfaces 172 on swingable tip ends thereof for engagement with an inner face of the frame 92a.

The film roll storage mechanism 88 has a reader 174 for reading ID information from the ID card 119 on the carriage 82 which is positioned with respect to the film roll storage mechanism 88 by the positioning mechanism 90. The shank 84 has a pair of diametrically opposite blocking fingers 176 disposed on an outer circumferential surface thereof near the distal end thereof and radially movable in the directions indicated by the arrow E. If the ID information read by the reader 174 is different from desired ID information, the blocking fingers 176 protrude radially outwardly to prevent film rolls 14 from being transferred from the carriage 82 to the shank 84.

Figure 8:
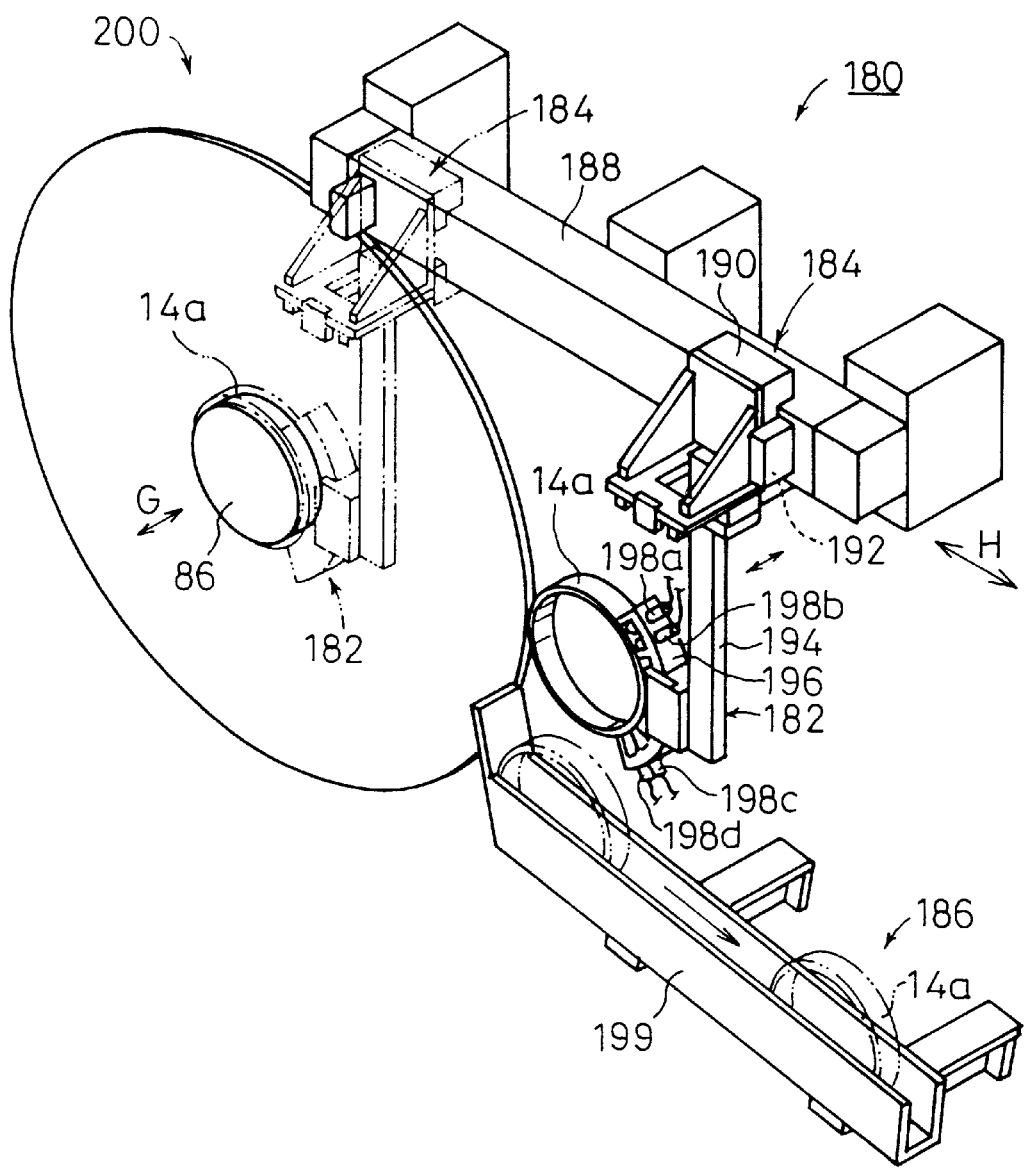
FIG. 8 is a perspective view of a roll core accumulating mechanism of the loading unit.
Figure 9:
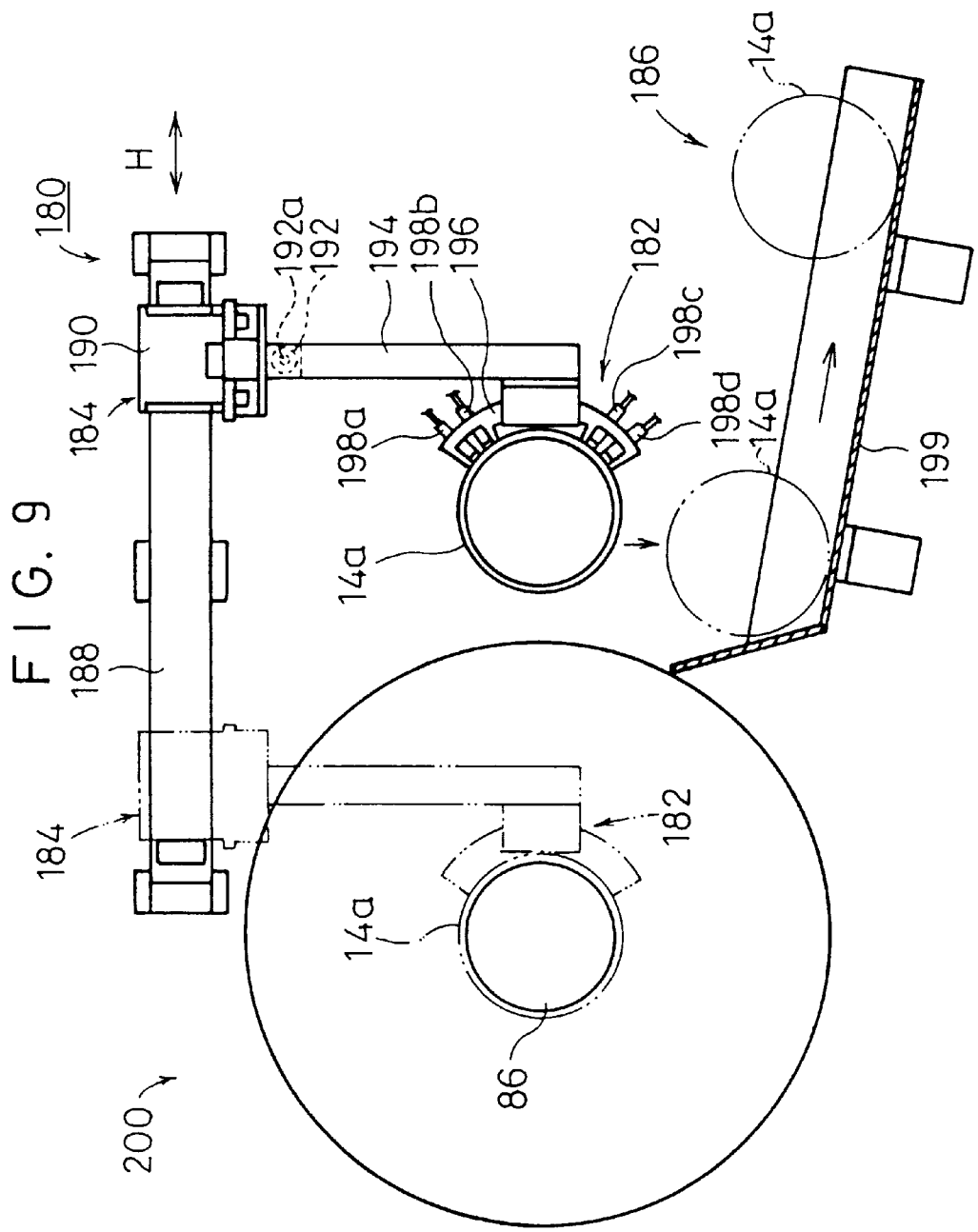
FIG. 9 is a side elevational view of the roll core accumulating mechanism.

As shown in FIGS. 8 and 9, the loading unit 43 has a roll core accumulating mechanism 180 for automatically removing an annular roll core 14a from the film unwinding shaft 86 and accumulating the removed roll core 14a when a film roll 14 on the roll core 14a is fully unwound from the film unwinding shaft 86. The roll core accumulating mechanism 180 comprises a holder 182 for holding an outer circumferential surface of a roll core 14a, an actuating device 184 for moving the holder 182 in the axial directions (indicated by the arrow G) of the film unwinding shaft 86 and the radial directions (indicated by the arrow H) of the film unwinding shaft 86, and an accumulating unit 186 for successively accumulating roll cores 14a.

The actuating device 184 has a horizontal rodless cylinder 188, a movable base 190 movable back and forth by and along the horizontal rodless cylinder 188 in the directions indicated by the arrow H, and a cylinder 192 fixed to a lower end of the movable base 190 and oriented in the directions indicated by the arrow G. A piston rod 192a projects from the cylinder 192 parallel to the axis of the film unwinding shaft 86. A vertical arm 194 has an upper end supported on the piston rod 192a. The holder 182 is mounted on a lower end of the vertical arm 194.

The holder 182 comprises an arcuate guide 196 shaped complementarily to a partial outer circumferential surface of a roll core 14a and a plurality of suction cups 198a through 198d mounted on the arcuate guide 196 for attracting the outer circumferential surface of the roll core 14a under vacuum to hold the roll core 14a against the arcuate guide 196. The arcuate guide 196 has a tip end positioned radially inwardly of the tip ends of the suction cups 198a through 198d with respect to the roll core 14a. The suction cups 198a through 198d are pneumatically connected to a vacuum generator (not shown).

The accumulating unit 186 has a stocking chute 199 which is inclined downwardly from an upper position where roll cores 14a drop from the holder 182.

As shown in FIG. 2, the film supply unit 18 comprises a feeder 200 for holding and unwinding a film roll 14, a splicer 202 for splicing a terminal end of the film roll 14 to a starting end of a new film roll 14, a perforator 206 forming perforations 204 (see FIG. 1) in opposite longitudinal sides of an elongate film F unwound from the film roll 14, a side printer 208 for printing latent image data on one or both of the sides of the elongate film F, and a cutter 210 for cutting off the elongate film F to films 16 of given length.

As shown in FIG. 6, the feeder 200 has an film unwinding shaft 86 disposed coaxially with the shank 84 of the film roll storage mechanism 88, for receiving one film roll 14 at a time from the shank 84. The film unwinding shaft 86 is combined with an air chuck 216 having three pawls 214 which are angularly spaced at given angular intervals and movable radially outwardly and inwardly. The film unwinding shaft 86 is rotatable about its own axis by a rotating mechanism 218 and axially movable back and forth in the directions indicated by the arrow G by an actuator 220.

The rotating mechanism 218 comprises a motor 222, and the actuator 220 comprises a cylinder 224. A piston rod 224a extending from the cylinder 224 is fixed to a slide base 226 which is slidably supported on a rail 228. The film unwinding shaft 86 and the rotating mechanism 218 are mounted on the slide base 226.

As shown in FIG. 2, the film producing and packaging system 10 is controlled by an in factory network including a computer 230. The film producing and packaging system 10 is divided into a plurality of blocks that are individually controlled by respective computers under the control of the computer 230.

Figure 11:
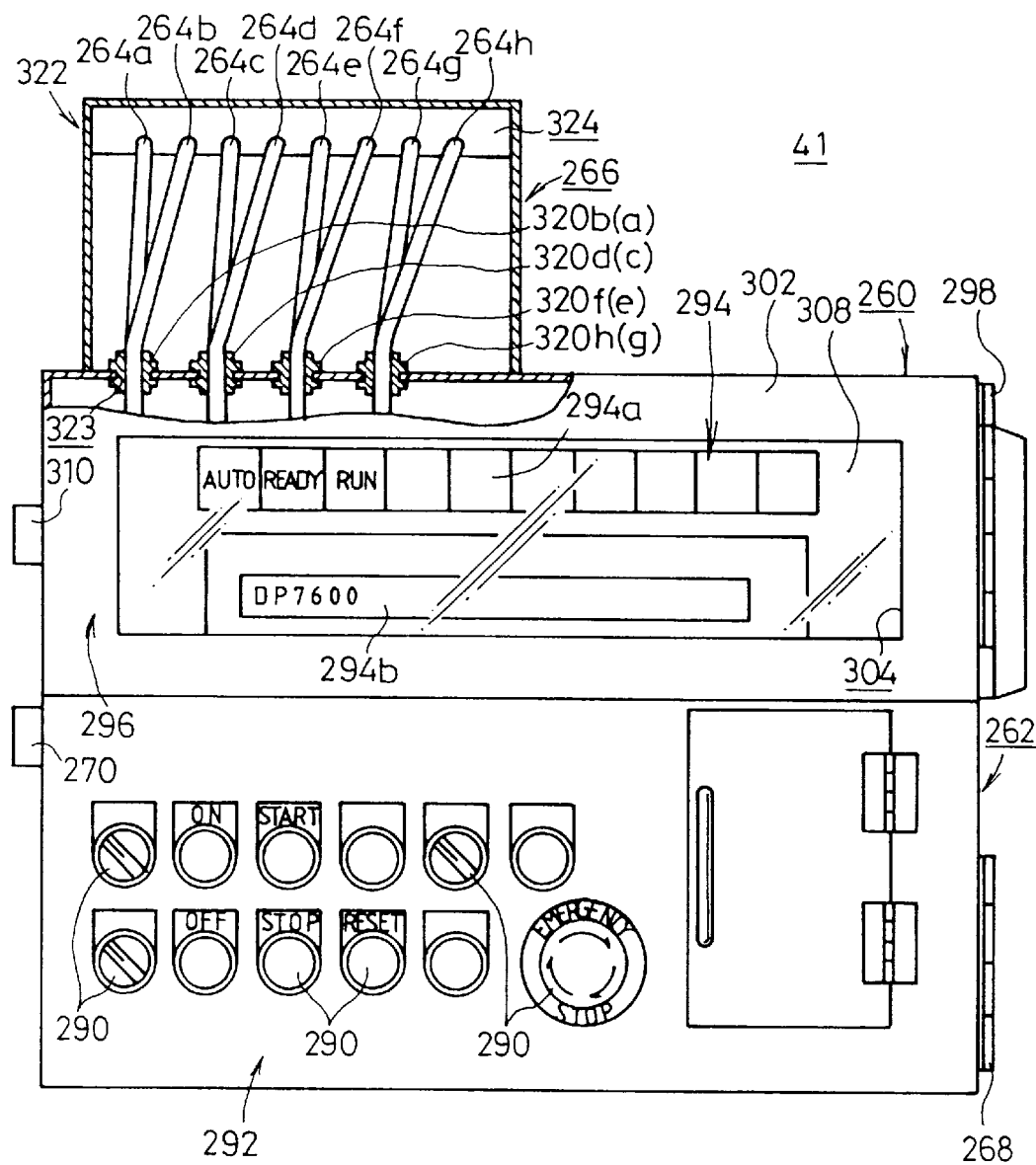
FIG. 11 is a front elevational view, partly cut away, of the control console.
Figure 12:
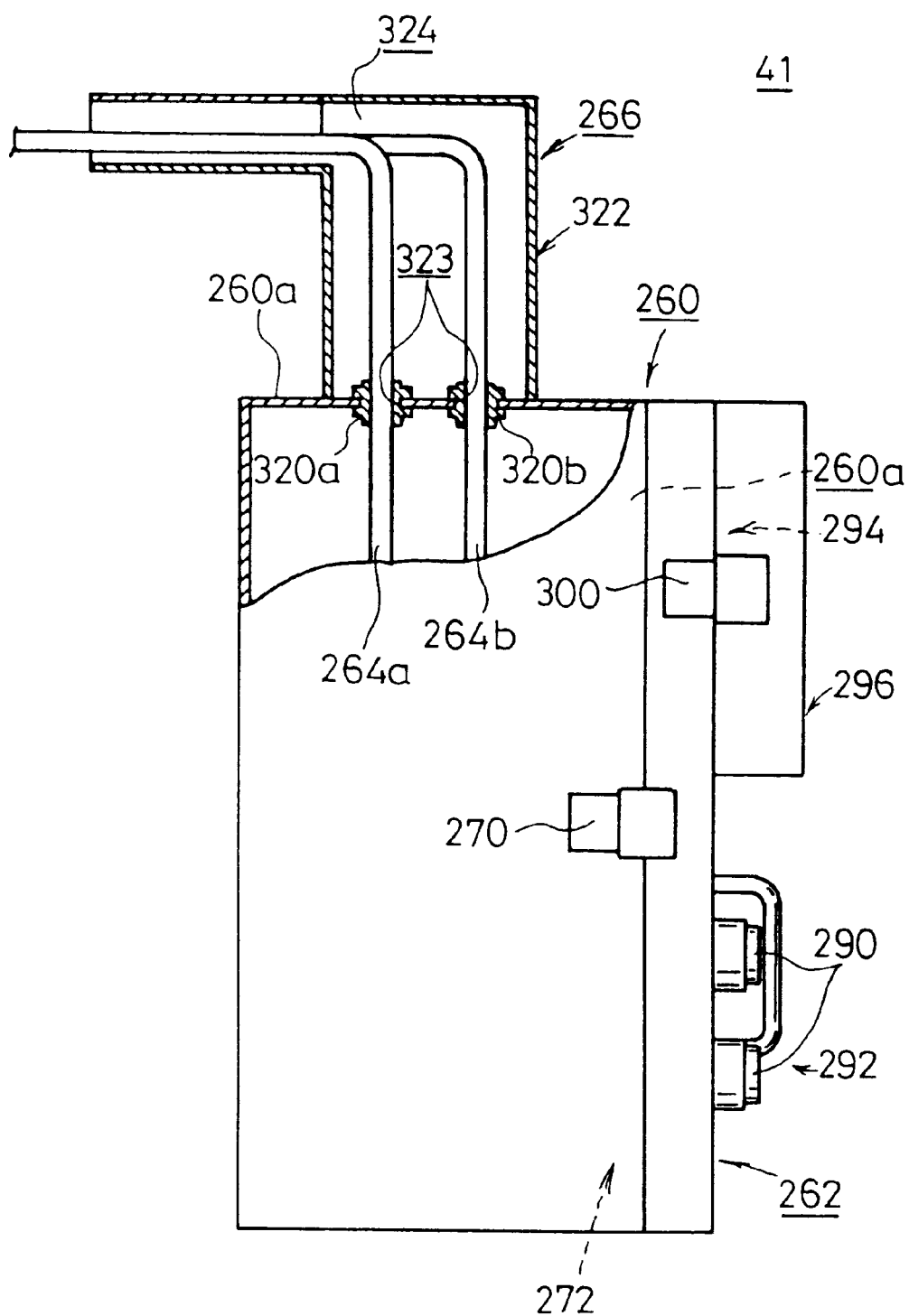
FIG. 12 is a side elevational view, partly cut away, of the control console.

As shown in FIGS. 10 through 12, the control console 41 comprises a console housing 260, a cover 262 openably and closably mounted on the console housing 260, and a light leakage prevention device 266 mounted on the console housing 260 for preventing light from leaking out of the console housing 260 into the dark room 44 along electric cables 264a through 264h extending from the console housing 260. The electric cables 264a through 264h are connected to a control board, the visual display unit 294, and the switch panel 292.

The console housing 260 is substantially in the form of a rectangular parallelepiped and is made up of a folded iron sheet or joined iron sheets with a light shield structure at each of the joints so that the console housing 260 provides a light shield function as a whole. Although not shown, the console housing 260 houses a power supply, various boards, etc. therein. The cover 262 is angularly movably attached by hinges 268 to a side edge of the console housing 260 on one side of an opening 260a in the console housing 260. A lock 270 is attached to a distal end of the cover 262 remote from its hinged end for locking the cover 262 to an opposite side edge of the console housing 260 on the opposite side of the opening 260a in the console housing 260.

Figure 13:
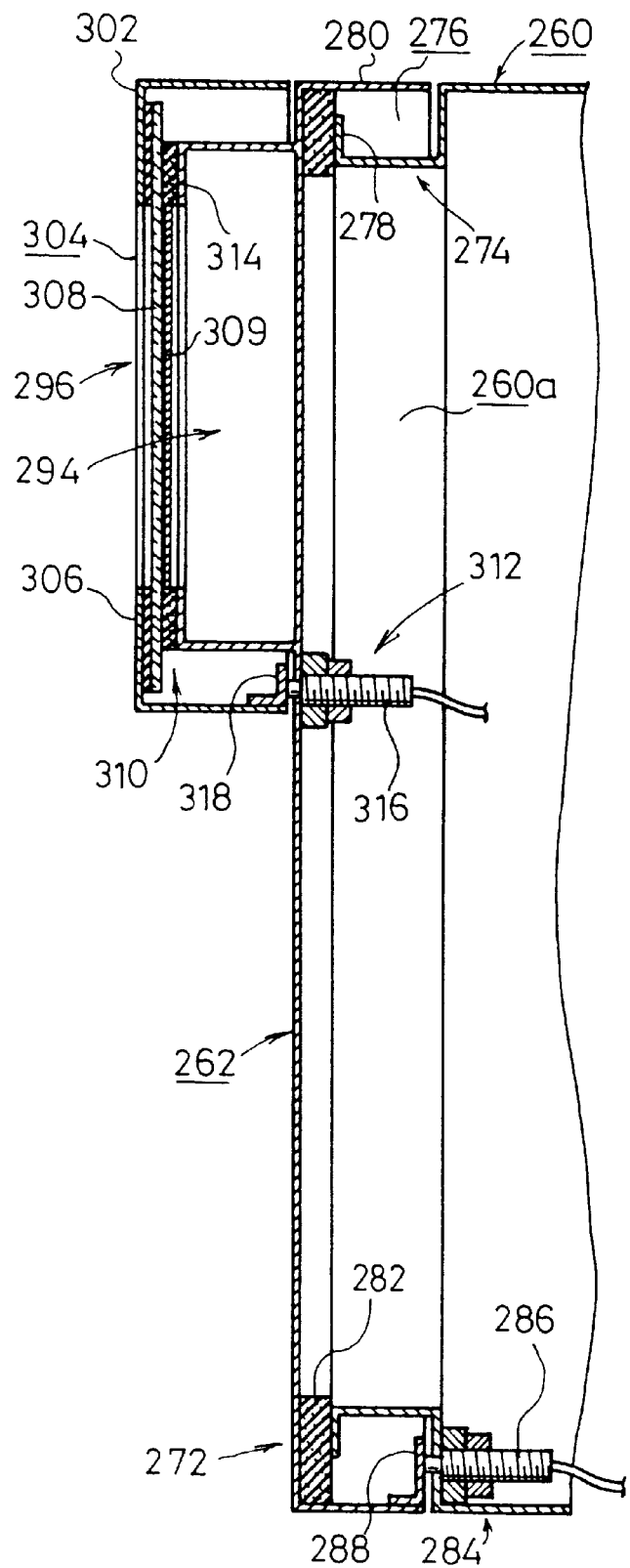
FIG. 13 is a fragmentary vertical cross-sectional view of the control console.

A light shield assembly 272 is disposed between the console housing 260 and the cover 262. As shown in FIG. 13, the light shield assembly 272 includes a light shield frame 274 extending around the opening 260a in the console housing 260. The light shield frame 274 has a step 276 bent inwardly from the console housing 260 and an engaging flange 278 bent outwardly from a distal end of the step 276. The cover 262 has a side plate 280 extending along and over the step 276. An elongate resilient element 282 such as a neoprene sponge strip is attached to an inner end of the side plate 280 and extends around the opening 260a for abutting engagement with the engaging flange 278 when the cover 262 is closed on the console housing 260.

A cover detector 284 is mounted on the console housing 260 and the cover 262 for detecting whether the cover 262 is closed on the console housing 260 or not. As shown in FIG. 13, the cover detector 284 comprises a first proximity switch 286 fastened to a bent portion of the step 276 of the light shield frame 274 by nuts and a first dog 288 fixed to the side plate 280 of the cover 262 so as to face the first proximity switch 286.

As shown in FIGS. 10 and 11, the cover 262 has a switch panel 292 on its front lower portion and supporting a plurality of switches 290. The cover 262 also has on its front upper portion a visual display device 294 and a window 296 disposed openably and closably over the visual display device 294.

The visual display device 294 comprises a lamp unit 294a for displaying various states with light and a display unit 294b for displaying numerals and characters. As shown in FIG. 11, the window 296 is angularly movably mounted on an end of the visual display device 294 by a hinge 298. The window 296 can be locked to the opposite of the visual display device 294 by a lock 300.

The window 296 comprises a cover 302 having a rectangular opening 304 defined therein and a transparent acrylic panel 308 attached to an inner surface of the cover 302 behind the opening 304 with a neoprene rubber strip 306 interposed therebetween. A known filter sheet 309 for passing infrared radiations only therethrough is interposed between the acrylic panel 308 and the visual display device 294. Since the filter sheet 309 passes radiations in the wavelength range from 750 nm to 850 nm or higher, it prevents films 16 from being exposed to visible light. In the dark room 44, the operator wears an infrared scope. The infrared scope has a CCD camera for imaging objects in the wavelength range from 750 nm to 850 nm or higher, and a small-size monitor for displaying images based on an image signal from the CCD camera. Therefore, the operator can read information displayed by the visual display device 294 in the dark room 44.

As shown in FIG. 13, a light shield assembly 310 is disposed between the visual display device 294 and the window 296. A window detector 312 is mounted on the cover 262 and the window 296 for detecting whether the window 296 is closed on the visual display device 294 or not.

The light shield assembly 310 comprises an elongate resilient element 314 such as a neoprene sponge strip which is attached to a peripheral edge of the visual display device 294. The elongate resilient element 314 can be pressed against the acrylic panel 308 when the window 296 is closed on the visual display device 294. The window detector 312 comprises a second proximity switch 316 fastened to the cover 262 by nuts and a second dog 288 fixed to the window 296 so as to face the second proximity switch 316.

The light leakage prevention device 266 comprises a plurality of flexible retainers 320a through 320h extending through an upper wall 260b of the console housing 260 and a light shield duct 322 mounted on the upper wall 260b of the console housing 260 in covering relation to the retainers 320a through 320h. The electric cables 264a through 264h extend respectively through the retainers 320a through 320h.

The retainers 320a through 320h, with the electric cables 264a through 264h extending respectively therethrough, are press-fitted respectively in through holes 323 defined in the upper wall 260b of the console housing 260. Since the retainers 320a through 320h are flexible, they can be elastically deformed under stresses imposed by the electric cables 264a through 264h, preventing gaps from being developed between the upper wall 260b and the electric cables 264a through 264h.

The light shield duct 322 is fixed to the upper wall 260b of the console housing 260 with a gasket (not shown) interposed therebetween. The light shield duct 322 has a bent passage 324 defined therein which is bent substantially 90° with the electric cables 264a through 264h from the console housing 260 extending therethrough. The bent passage 324 has a vertical portion extending upwardly from the upper wall 260b along vertical lengths of the electric cables 264a through 264h, and a horizontal portion extending from the upper end of the vertical portion along horizontal lengths of the electric cables 264a through 264h and opening into the dark room 44.

Operation of the film producing and packaging system 10 will be described below.

As shown in FIG. 2, a film roll 14 mounted on the film unwinding shaft 86 of the film supply unit 18 is unwound when the film unwinding shaft 86 is rotated. An elongate film F unreeled from the film roll 14 is fed to perforator 206, which forms perforations 204 in opposite longitudinal sides of the elongate film F. Then, latent image data is printed on one or both of the sides of the elongate film F by the side printer 208. The elongate film F is fed to the cutter 210, and cut thereby to a film 16 of given length (see FIG. 1).

The film 16 has its leading end 16a engaged in a spool 20 and wound on the spool 20, producing a film coil 32. The film coil 32 with a trailing end 16c of the film 16 projecting to a given length is delivered to the assembling unit 32, which inserts the film coil 32 into a vertically oriented cartridge 28 through one open end thereof. After the film coil 32 is inserted in the cartridge 28, a cap 26b is staked on the opposite open end of the cartridge 28, thus producing an assembled cartridge 34.

The assembled cartridge 34 is fed to the encasing unit 42, which is also supplied with a case 38. In the encasing unit 42, the assembled cartridge 34 is inserted into the case 38, after which a case cap 40 is mounted on an open end of the case 38. In this manner, a packaged product 12 is produced.

The above operation will be described in greater detail below with respect to a film loading method according to the present invention.

The carriage 82 is placed in a cutting machine (not shown). The cutting machine cuts a film roll blank successively at axial intervals into a plurality of film rolls 14. The film rolls 14 are successively placed onto the support shaft 80 of the carriage 82 in the order in which the film rolls 14 are severed. When the film rolls 14 are held on the support shaft 80, the light shield cover 94 is closed on the carriage housing 92, and locked to the carriage housing 92 by the locks 118.

The carriage 82 is delivered from the cutting machine through the bright room 45 into the antechamber 68 through the opening 70. Thereafter, the carriage 82 is introduced from the antechamber 68 into the dark room 44. In the dark room 44, the locks 118 are released to unlock the light shield cover 94 from the carriage housing 92, and the light shield cover 94 is opened away from the carriage housing 92 (see FIG. 4). The carriage 82 is then displaced toward the film roll storage mechanism 88.

The carriage 82 is positioned with respect to the film roll storage mechanism 88 by the guide mechanism 150 of the positioning mechanism 90. Specifically, as shown in FIGS. 4 and 6, the shaft 128 rotates to turn the guide plate 154 in unison with the shank 84 in one of the directions indicated by the arrow D until the guide plate 154 is positioned in alignment with the locking mechanism 152. Then, the operator grips the handle 110 of the carriage 82 and moves the carriage 82 toward the guide plate 152. The guide roller 156 mounted on the bottom of the carriage housing 92 is smoothly introduced into the guide slot 158 in the guide plate 154 while being guided by the tapered surfaces 160, whereupon the carriage 82 is positioned with respect to the film roll storage mechanism 88.

At this time, as shown in FIG. 14, the hooks 168 of the locking mechanism 152 have been retracted downwardly as indicated by the two-dot-and-dash lines. After the carriage 82 is positioned with respect to the film roll storage mechanism 88 by the guide mechanism 150, the cylinders 166 of the locking mechanism 152 are actuated. The hooks 168 are angularly moved upwardly as indicated by the solid lines in FIG. 14, gripping the frame 92a of the carriage housing 92 between the bearing plate 164 and the tapered surfaces 172, whereupon the carriage 82 is locked on the film roll storage mechanism 88. As shown in FIG. 5, the support shaft 80 of the carriage 82 and the shank 84 of the film roll storage mechanism 88 are now aligned coaxially with each other and held in abutment against each other.

The reader 174 reads ID information from the ID card 119 on the carriage housing 92. If the read ID information is different from desired ID information, then the blocking fingers 176 protrude radially outwardly to prevent film rolls 14 from being transferred from the support shaft 80 to the shank 84. If the read ID information is the same as desired ID information, then the blocking fingers 176 are retracted radially inwardly to allow film rolls 14 to be transferred from the support shaft 80 to the shank 84.

When all film rolls 14 have been transferred from the support shaft 80 to the shank 84, the locking mechanism 152 unlocks the frame 92a, thereby releasing the carriage 82 from the film roll storage mechanism 88. The light shield cover 94 is closed on the carriage housing 92, and the carriage 82 is delivered to the cutting machine.

On the film roll storage mechanism 88, the leading ends of the elongate films F of the film rolls 14 held on the shank 84 are drawn out to the splice assisting assembly 140, attracted by the suction box 144, and cut by the cutter 142. The photosensors detect the number of film rolls 14 that are attracted by the suction box 144. If the detected number of film rolls 14 is different from a predetermined number, then an alarm signal is issued to the operator.

In the film supply unit 18, when a film roll 14 is fully unwound, a roll core 14a remains on the film unwinding shaft 86. As shown in FIGS. 8 and 9, the actuating device 184 of the roll core accumulating mechanism 180 is operated to move the movable base 190 toward the film unwinding shaft 86 until the holder 182 mounted on the arm 194 is placed against an outer circumferential surface of the roll core 14a on the film unwinding shaft 86.

The air chuck 216 is operated to displace the pawls 214 radially inwardly into the film unwinding shaft 86, releasing the roll core 14a disposed on the film unwinding shaft 86. At the same time, the suction cups 198a through 198d of the holder 182 start attracting the roll core 14a. The roll core 14a, whose outer circumferential surface is pressed against the arcuate guide 196, is securely held by the holder 182 by being attracted by the suction cups 198a through 198d and held by the arcuate guide 196.

The cylinder 192 is actuated to move the arm 194 in an axial direction of the film unwinding shaft 86, indicated by the arrow G, away from the film unwinding shaft 86, for thereby removing the coil core 14a held by the holder 182 from the film unwinding shaft 86. The rodless cylinder 188 is actuated to move the movable base 190 radially away from the film unwinding shaft 86, after which the coil core 14a is released from the suction cups 198a through 198d. The coil core 14a drops onto the accumulating unit 186, moves along the inclined stocking chute 199, and is accumulated in a given accumulating position. The coil core 14a thus retrieved will be used as the core of a new film roll 14.

After the coil core 14a has been removed from the film unwinding shaft 86, the shaft 128 of the film roll storage mechanism 88 is turned about 90° about its own axis to orient the shank 84 coaxially with the film unwinding shaft 86 (see FIG. 6). The motor 122 is energized to rotate the ball screw 123 to move the slide base 124 toward the film unwinding shaft 86 until the shank 84 abuts coaxially against the film unwinding shaft 86.

The cylinder 134 of the actuator unit 136 is actuated to displace the pusher disk 132 toward the film unwinding shaft 86 while the pusher disk 132 is being guided by the guide bars 138 for thereby transferring a foremost film roll 14 from the shank 84 onto the film unwinding shaft 86. After the foremost film roll 14 is transferred from the shank 84 onto the film unwinding shaft 86, the air chuck 216 is operated to project the pawls 214 radially outwardly to retain the transferred film roll 14 on the film unwinding shaft 86. On the film roll storage mechanism 88, the motor 122 is energized to retract the slide base 124 away from the film unwinding shaft 86.

The elongate film F of the film roll 14 newly mounted on the film unwinding shaft 86 has its leading end fed to the splicer 202 by rotation of the film unwinding shaft 86. In the splicer 202, the trailing end of an existing elongate film F is applied by a splicing tape to the leading end of the elongate film F of the film roll 14 newly mounted on the unwinding shaft. The elongate film F unreeled from the film roll 14 newly mounted on the film unwinding shaft 86 is then fed to the perforator 206. The elongate film F is thereafter processed and packaged as described above.

In the illustrated embodiment, while a plurality of film rolls 14 are being held on the support shaft 80 of the carriage 82, the carriage 82 is positioned with respect to the film roll storage mechanism 88 to hold the support shaft 80 coaxially with the shank 84. Then, the film rolls 14 are transferred from the support shaft 80 onto the shank 84, after which the shank 84 is positioned coaxially with the film unwinding shaft 86 of the film supply unit 18. The film rolls 14 are then loaded one at a time from the shank 84 onto the film unwinding shaft 86.

Therefore, when film rolls 14 are transferred from the carriage 82 via the film roll storage mechanism 88 to the film unwinding shaft 86, it is not necessary to manually lift the film rolls 14, but they may simply be slid axially from the support shaft 80 onto the shank 84 and then from the shank 84 onto the film unwinding shaft 86. Therefore, the film rolls 14 can be loaded smoothly one at a time with less manual work onto the film unwinding shaft 86.

The carriage 82 and the film roll storage mechanism 88 are positioned with respect to each other by the guide mechanism 150, and locked securely together by the locking mechanism 152. The support shaft 80 and the shank 84 can coaxially be positioned quickly and highly accurately with respect to each other. Thus, the film rolls 14 can efficiently be transferred from the support shaft 80 onto the shank 84.

The film rolls 14 are supported on the support shaft 80 in the order in which they are severed by the cutting machine, and thereafter loaded from the support shaft 80 via the shank 84 one at a time onto the film unwinding shaft 86. Therefore, the film rolls 14 are loaded one at a time onto the film unwinding shaft 86 in the order in which they are severed by the cutting machine. While the film rolls 14 are being transferred from the cutting machine to the film unwinding shaft 86, the film rolls 14 can simply be handled, and defect information of the film rolls 14 can easily be managed.

The ID card 119 which stores ID information including the name, number, etc. of the carriage 82 is attached to the carriage 82. When the carriage 82 is positioned with respect to the film roll storage mechanism 88, the ID information stored by the ID card 119 is read by the reader 174. If the read ID information is different from desired ID information, then the blocking fingers 176 protrude radially outwardly to prevent film rolls 14 from being transferred from the support shaft 80 to the shank 84. Consequently, the wrong film rolls 14 are reliably prevented from being transferred onto the film roll storage mechanism 88, and hence film rolls 14 can be processed highly efficiently for high product quality.

Furthermore, the carriage 82 has the carriage housing 92 supporting the support shaft 80 and the light shield cover 94 openable and closable with respect to the carriage housing 92. The mating surfaces of the carriage housing 92 and the light shield cover 94, i.e., the mating surfaces 102a, 102b, the front mating surface 104, and the rear mating surface 106 of the carriage housing 92 and the side mating surfaces 112a, 112b, the front mating surface 114, and the rear mating surface 116 of the light shield cover 94 extend as straight surfaces, and the elongate elastomeric element 108 of the light shield member 96 are interposed between these mating surfaces when the light shield cover 94 is closed on the carriage housing 92. The light shield cover 94 and the carriage housing 92 can thus provide an effective light shield function with a simple structure for preventing the film rolls 14 on the support s haft 80 from being unnecessarily exposed to light. On the carriage 82, the lower ends of the side mating surfaces 102a, 102b which extend in the axial direction (indicated by the arrow B) of the support shaft 80 are positioned lower than the lower edges of the film rolls 14 held on the support shaft 80. Therefore, when the light shield cover 94 is opened, the carriage housing 92 is widely open at the distal end of the support shaft 80, allowing film rolls 14 to be smoothly and easily removed from and placed onto the support shaft 80.

The control console 41 is disposed in the dark room 44. While visually confirming information displayed by the lamp unit 294a and the display unit 294b of the visual display device 294, the operator can operate the switches 290 on the switch panel 292 in the dark room 44.

The electric cables 264a through 264h connected to the control board, the visual display device 294, and the switch unit 292 extend from the console housing 260. Therefore, light would tend to leak from the console housing 260 into the dark room 44 through gaps between the electric cables 264a through 264h and the edges of the through holes 323 defined in the upper wall 260b of the console housing 260.

According to the illustrated embodiment, the electric cables 264a through 264h extend respectively through the flexible retainers 320a through 320h which are press-fitted in the through holes 323 defined in the upper wall 260b of the console housing 260. Since the flexible retainers 320a through 320h are elastically deformed between the edges of the through holes 323 and the electric cables 264a through 264h, no gaps will be formed between the edges of the through holes 323 and the electric cables 264a through 264h, and light is effectively prevented from leaking from the console housing 260 into the dark room 44.

Because the electric cables 264a through 264h extend respectively through the flexible retainers 320a through 320h, the electric cables 264a through 264h are held in highly intimate contact with the respective retainers 320a through 320h, eliminating any light leakage along the electric cables 264a through 264h.

The light shield duct 322 is mounted on the upper wall 260b of the console housing 260 in covering relation to the retainers 320a through 320h. The light shield duct 322 has the bent passage 324 which is bent substantially 90° with the electric cables 264a through 264h extending therethrough. Consequently, even if light happens to leak from the console housing 260 along the electric cables 264a through 264h, the light is blocked by an upper wall of the light shield duct 322 against leakage out of the bent passage 324.

The light leakage prevention device 266 which is of a relatively simple structure having the retainers 320a through 320h and the light shield duct 322 is reliably effective to prevent light from leaking from the console housing 260 along the electric cables 264a through 264h into the dark room 44.

Moreover, the light shield assembly 272 comprising the elongate resilient element 282 is disposed between the control console 260 and the cover 262, and the cover detector 284 is mounted on the console housing 260 and the cover 262 for detecting whether the cover 262 is closed on the console housing 260 or not. Therefore, when the cover 262 is closed on the console housing 260 and locked thereto by the lock 270, light is prevented by the light shield assembly 272 from leaking from the console housing 260 into the dark room 44.

When the cover 262 is accidentally opened, the first dog 288 is moved with the cover 262, triggering the first proximity switch 286 to detect an open state of the cover 262. After the open state of the cover 262 is detected by the first proximity switch 286, the visual display unit 294 is automatically turned off by a control circuit (not shown). Accordingly, no light leaks from the console housing 260 and hence films 16 are prevented from being exposed to light.

The light shield assembly 310 is disposed between the visual display unit 294 and the window 296, and the window detector 312 is mounted on the cover 262 and the window 296 for detecting whether the window 296 is closed on the visual display device 294 or not. The light shield assembly 310 prevents light other than infrared radiations from leaking from the visual display device 294 into the dark room 44. When the window 296 is accidentally opened, such an open state is detected by the second proximity switch 316. After the open state of the window 296 is detected by the second proximity switch 316, the visual display unit 294 is automatically turned off by the control circuit (not shown). Accordingly, no light leaks from the visual display device 294 into the dark room 44.

With the present invention, as described above, after the support shaft of the carriage with a plurality of film rolls held thereon is positioned coaxially with the shank of the film roll storage mechanism, and the film rolls are transferred from the support shaft onto the shank, the shank is positioned coaxially with the unwinding shaft, and then the film rolls are loaded one at a time from the shank onto the unwinding shaft. The film rolls only need to be slid axially from the support shaft onto the shank and then from the shank, one at a time, onto the unwinding shaft, without any manual intervention to lift the film rolls. Therefore, the film rolls can easily and smoothly be loaded one at a time onto the unwinding shaft.

Furthermore, the mating surfaces, which extend axially of the support shaft, of the carriage housing have their lower ends are positioned lower than the lower edges of the film rolls held on the support shaft. Therefore, when the light shield cover is opened away from the carriage housing, the carriage housing is widely open at the distal end of the support shaft, allowing film rolls to be smoothly and easily removed from and placed onto the support shaft.

Moreover, the control console has the light leakage prevention device mounted on the console housing for preventing light from leaking out of the console housing into the dark room along the electric cables extending from the console housing. The light leakage prevention device comprises the flexible retainers receiving the electric cables, respectively, and extending through the upper wall of the console housing, and the light shield duct mounted on the upper wall of the console housing in covering relation to the retainers and having the bent passage with the electric cables extending from the console housing therethrough. The light leakage prevention device, which is of a simple structure, is effective in securely blocking light against leakage from the console housing along the electric cables into the dark room.

Although a certain preferred embodiment of the present invention has been shown and described in detail, it should be understood that various changes and modifications may be made therein without departing from the scope of the appended claims.

What is claimed is:

1. A method of loading a film roll of an elongate photographic photosensitive film onto a film unwinding shaft of a film producing apparatus, comprising the steps of:
   delivering a carriage with a plurality of film rolls held on a support shaft thereof, to a film roll transfer position in a dark room;
   positioning said support shaft of the carriage coaxially with a shank of a film roll storage mechanism disposed in said film roll transfer position;
   transferring said film rolls from said support shaft onto said shank;
   positioning said shank with said film rolls carried thereon coaxially with said film unwinding shaft of the film producing apparatus; and
   loading said film rolls one at a time from said shank onto said film unwinding shaft.

2. A method according to claim 1, further comprising the steps of:
   cutting a film roll blank successively at axial intervals into said film rolls; and
   thereafter, delivering said film rolls in the order in which the film rolls are severed, onto said support shaft of said carriage.

3. A method according to claim 1, further comprising the steps of:
   unwinding a film roll fully from said film unwinding shaft; and
   thereafter, automatically removing a remaining roll core from said film unwinding shaft and accumulating the removed roll core.

4. A method according to claim 1, further comprising the steps of:
   reading ID information from said carriage; and
   if the read ID information is different from predetermined ID information, protruding a pawl radially outwardly from said shank to prevent said film rolls from being transferred from said support shaft onto said shank.

5. A film producing and packaging system comprising:
   a loading unit for loading a film roll of an elongate photographic photosensitive film onto a film unwinding shaft of a film producing apparatus;
   said loading unit comprising:
   a carriage for covering a plurality of film rolls to shield the film rolls from light, said carriage having a support shaft for supporting the film rolls;
   a film roll storage mechanism disposed in a dark room and having a shank for receiving film rolls from said carriage, for loading film rolls one at a time onto a film unwinding shaft of said film supply unit; and
   a positioning mechanism for positioning said support shaft and said shank coaxially with each other and fixing said carriage and said film roll storage mechanism with respect to each other.

6. A film producing and packaging system according to claim 5, wherein said positioning mechanism comprises:
   guide means for guiding said carriage to a positioning location of said film roll storage mechanism; and
   locking means for holding said carriage on said film roll storage mechanism.

7. A film producing and packaging system according to claim 6, wherein said guide means comprises:
   a guide plate angularly movable in unison with said shank about a vertical axis and having a tapered guide slot defined therein and extending parallel to an axis of said shank; and
   a guide roller mounted on the carriage for being inserted into said guide slot.

8. A film producing and packaging system according to claim 5, further comprising:
   ID information storage means mounted on said carriage, for storing ID information of said carriage; and
   a blocking finger mounted radially movably on an outer circumferential surface of said shank for radially outward protrusion to prevent said film rolls from being transferred from said support shaft onto said shank if the ID information read from said ID information storage means is different from predetermined ID information.

9. A film producing and packaging system according to claim 5, further comprising:

a roll core accumulating mechanism for automatically removing a roll core, which remains on said film unwinding shaft after a film roll is fully unwound from said film unwinding shaft, from said film unwinding shaft, and accumulating the removed roll core.

10. A film producing and packaging system according to claim 9, wherein said roll core accumulating mechanism comprises:

holder means for holding a circumferential surface of the roll core;

actuating means for moving said holder means axially and radially with respect to said film unwinding shaft;

said holder means comprising:
a guide shaped complementarily to the circumferential surface of said roll core; and
a plurality of suction cups mounted on said guide for attracting the circumferential surface of the roll core to hold said roll core against said guide.

11. A film producing and packaging system according to claim 5, wherein said carriage comprises:

a carriage housing;

said support shaft being mounted on said carriage housing for supporting said film rolls arrayed in an axial direction thereof;

a light shield cover openable and closable with respect to said carriage housing for allowing said film rolls to be removed from and supported on said support shaft; and a light shield member disposed between said carriage housing and said light shield cover.

12. A film producing and packaging system comprising:

a carriage for supporting a plurality of film rolls of an elongate photographic photosensitive film in a light-shielded state;

said carriage comprising:
a carriage housing;
a support shaft mounted on said carriage housing for supporting said film rolls arrayed in an axial direction thereof;
a light shield cover openable and closable with respect to said carriage housing for allowing said film rolls to be removed from and supported on said support shaft; and
a light shield member disposed between said carriage housing and said light shield cover;
said carriage housing having side mating surfaces extending obliquely downwardly along said support shaft toward a distal end of said support shaft, said light shield cover having side mating surfaces engageable with said mating surfaces of the carriage housing when the light shield cover is closed on said carriage housing, said side mating surfaces of the carriage housing having lower ends positioned lower than lower edges of the film rolls supported on said support shaft.

13. A film producing and packaging system according to claim 12, wherein said carriage housing has front and rear mating surfaces joined to said side mating surfaces thereof, and said light shield cover has front and rear mating surfaces joined to said side mating surfaces, and wherein all of said side, front, and rear mating surfaces of said carriage housing and said light shield cover extend respectively as straight surfaces.

14. A film producing and packaging system according to claim 12, wherein said light shield member comprises an elastomeric member extending along said side, front, and rear mating surfaces of said carriage housing and said light shield cover.

15. A film producing and packaging system according to claim 12, further comprising:

ID information storage means mounted on said carriage, for storing ID information of said carriage.

* * * * *